July 20, 1948.  E. LEMMERS  2,445,678
ELECTRIC DISCHARGE DEVICE
Filed Feb. 12, 1942
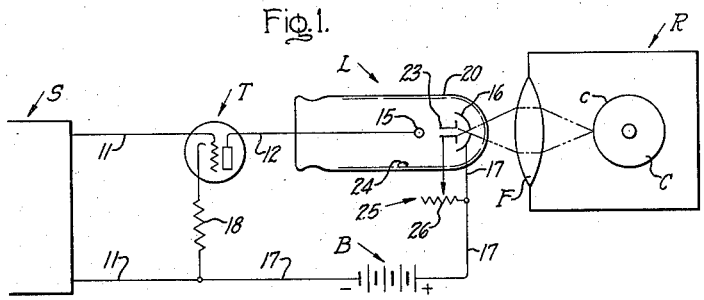
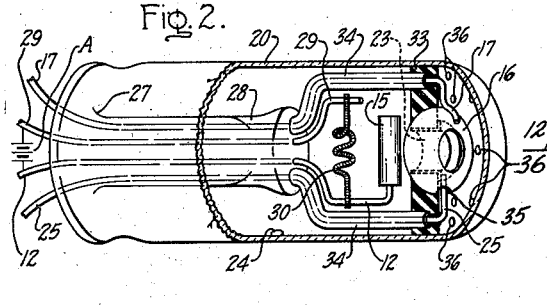
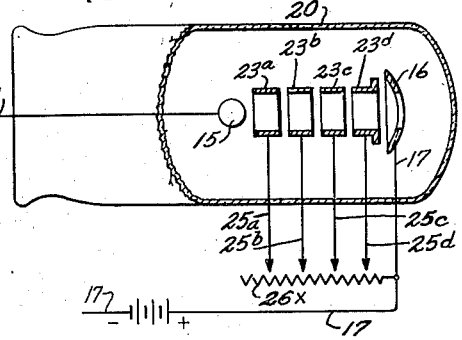
Inventor:
Eugene Lemmers,
by John H. Anderson
His Attorney.

Patented July 20, 1948

2,445,678

UNITED STATES PATENT OFFICE 2,445,678

ELECTRIC DISCHARGE DEVICE

Eugene Lemmers, Cleveland Heights, Ohio, assignor to General Electric Company, a corporation of New York Application February 12, 1942, Serial No. 430,593

10 Claims. (Cl. 315—208)

This invention relates to the modulation of an electric discharge, and is especially concerned with controlling the relation between variation of the discharge current and resulting variation in the intensity of the radiation, visible or otherwise, from the discharge. The invention permits of constructing a modulatable discharge lamp in which the intensity or brilliance of radiation from the discharge varies in a greater proportion than the discharge current, and, if desired, in a very large proportion. Provision can be made to adjust and vary at pleasure the proportional relation between variation of discharge current and corresponding variation of intensity of radiation. The invention is useful in connection with the translation of electrical signals derived from phenomena of almost any kind into light or other radiation, and is particularly applicable to discharge devices or lamps resembling the type known as "crater lamps."

My discharge device or lamp may comprise a cathode and a main anode spaced in front of the cathode and so arranged, preferably, that the discharge between cathode and anode is visible end-on past the latter, a positive column discharge being preferred and disclosed and claimed herein, although the principle involved in this invention may be applied to lamps of the well known negative glow type, and disclosed and claimed in my divisional application Serial No. 551,793 filed August 30, 1944. Provision for modulating the potential difference and the total discharge current in the lamp may be made in any suitable manner, in accordance with any desired phenomenon or signal. For the purposes of my invention, another anode or control electrode may also be provided, with means for maintaining a potential difference and a resulting discharge between the cathode and this other anode, from the same source of potential as that acting between the cathode and the main anode. Accordingly, a part of the discharge is diverted or bled off from the main discharge (out of its path to the main anode) in a greater or less proportion, with the result that the end-on intensity of the radiation from the main discharge varies in a greater proportion than does the total discharge current. One way of accomplishing this is to connect the other anode to the main anode through a resistance; and one way of varying the proportional relation between variation of the total discharge current and corresponding variation of intensity of radiation is to vary or adjust this resistance. Various arrangements and constructions may be employed, several of which will be illustrated and explained.

Still other features and advantages of the invention will appear from the following description of species and forms of embodiment, and from the drawings.

In the drawings, Fig. 1 is a general diagrammatic view of a "signalling" system advantageously embodying my invention in simple form; and Fig. 2 is a tilted or perspective view of a lamp or discharge device suitably embodying features such as represented in Fig. 1.

Fig. 3 is a diagrammatic view of a discharge device embodying the invention in a more highly developed form resembling that illustrated in Figs. 1 and 2.

Fig. 1 illustrates my invention as used in a system where signals in the form of electrical impulses of varying intensity received from a source S are to be translated into luminous or other radiation of varying intensity which acts on any desired receiving system or responsive means R for displaying or registering the same, here illustrated as including a focusing lens F and a photosensitive chart c carried by a revolving cylinder C and responsive to the light spot from the lens F. Electrical amplifying means may be interposed between the signal source S and the lamp L, being here illustrated as a vacuum tube T for producing substantially distortionless amplification. This tube T is shown connected in the usual manner to receive signals from the source S through an input circuit 11 and to feed the amplified output to the electrical discharge device or lamp L through an output circuit 12. A suitable D. C. source of discharge current B for the discharge device or lamp L is shown connected between the lamp cathode 15 and anode 16 through a power circuit 17, the amplifier T, and the amplifier output circuit 12.

As shown in Figs. 1 and 2, the discharge device or lamp L comprises a glass envelope 20 enclosing the cathode 15 and the anode 16, which are spaced apart to permit a positive column discharge between them. Adjacent or around the path of discharge between these electrodes 15, 16, other anode means 23 are provided, and may be constructed as a tube-like positive column channel, or crater, of conductive material, like sheet metal. The anode 16 is so arranged that the positive column discharge inside the crater 23 is potentially or actually visible end-on past it from this end of the envelope 20, in whole or in part. As shown, this anode 16 is annular and coaxial with the crater 23 and the cathode 15, as well as with the envelope 20, in a plane perpendicular to the common axis of the parts. Thus the luminous or other radiation from the positive column discharge "shines" from inside the crater 23 endwise through the anode 16 on the receiving system R. The envelope 20 may contain a low-pressure atmosphere of starting gas, such as argon at a pressure of some 0.5 to 20 mm. of mercury, and may also contain a vaporizable and ionizable working substance such as mercury, here indicated by a supply droplet 24 inside the envelope, which may exceed the amount that will vaporize during operation of the lamp L. The crater or anode 23 is electrically connected to the anode 16 through a connection 25, shown as including an adjustable resistance 26 located outside the envelope 20, and also a portion of the circuit 17.

One suitable construction of the lamp L that is schematically shown in Fig. 1 is illustrated in some detail in Fig. 2. As there shown, the envelope 20 is a cylindrical glass bulb with the usual stem and flare construction 27 at one end, including a press 28 through which are sealed the circuit wires 12, 17, 25, and an additional wire 29. Between the ends of the leads 12 and 29 (just in front of the stem press 28) is connected a resistance heater 30 such as a coiled coil of fine tungsten wire, which serves to maintain a fairly constant temperature of the envelope 20, and a fairly constant pressure of mercury vapor therein, notwithstanding the wide variations of the discharge current incident to the operation of the device. Preferably the rear end of the bulb 20 is somewhat extended, as shown, to give an exposed area outside the lamp base and socket (not shown) for atmospheric cooling to help maintain a reasonable and sufficiently constant mercury vapor pressure in the bulb. The leads 12, 29 may be connected to any suitable source of heating current, as diagrammatically indicated at A in Fig. 2. The cathode 15 here shown is what is known as a "cold cathode," consisting of a cylinder of metallic thorium that extends diametrally across the envelope 20 at a considerable distance in front of the heater 30 and is supported at one end by its connection to the lead wire 12. Any heating effect of the coil 30 on the cathode 15 is insufficient to affect the essential action of the latter, and does not render it thermionically emissive. As a matter of fact, indeed, a thermionic cathode might be disadvantageous, by giving rise to electrical oscillations or variations of the discharge current and the radiation from the discharge that would distort the desired modulated output from the device as received by the system R.

The main anode 16 and the other anode or crater 23 are shown as associated with a transverse circular insulative disc 33 of any suitable ceramic material (such as lava, for example) which fits rather loosely into the cylindrical bulb 20. As here shown, the part 23 consists of a flanged metal sleeve (e. g., nickel) fitted into a central hole in the disc 33, coaxial with the envelope 20, with its flange at the outer or front side of the disc. The main anode 16 is shown as made in the form of a centrally apertured sheet metal "dome" (e. g., nickel) lying edgewise against the disc 33, around and in front of the flange of the part 23. The lead wires 17, 25 spread outward from the stem press 28 and extend forward through countersunk holes in the disc 33, being covered with vitreous or ceramic insulation 34 which extends from the press 28 into the enlarged rear ends of the holes. In front of the disc 33, the bare ends of the wires 17, 25 are bent inward to the parts 16 and 23, to which they are welded, the part 23 having a notch 35 in its edge to pass the lead 25 with safe clearance. The leads 17, 25 with their insulative coverings 34 serve to hold the disc 33 in fixed position in the envelope 20, as well as the parts 16 and 23. The disc 33 is shown as pierced with a number of holes 36 to permit free passage of the operating atmosphere of mercury and starting gas.

In operation, the discharge current in the lamp L is proportional to the signal intensity from S. The intensity of the endwise radiation from the discharge toward the receiving system R depends on the discharge current and also on the axial length or "depth" of the positive column. In the absence of the anode means 23 with its connection 25, the discharge would always extend in full strength clear to the anode 16; in other words, its length would be constant and its intensity would vary in sole dependence on the discharge current. However, the resistance 26 in the connection 25 makes the part 23 an anode or control electrode means of lower potential relative to the cathode 15 than the main anode 16, so that part of the discharge goes to this part 23, shortening the discharge and diminishing its end-on intensity of radiation. The degree to which this takes place depends on the magnitude of the resistance 26 in the connection 25, as well as on the position of the part 23 and its area per unit of length. If the effective resistance 26 were zero, all the discharge would go to the part 23; if it were infinite, or virtually so, all the discharge would go to the main anode 16.

The anode means or conductive channel 23 around the discharge also affects its visible brightness or intensity of endwise radiation in another way. Being positive relative to the discharge where it surrounds it, the part 23 enlarges the cross section of the discharge within it, and dims its intensity of endwise radiation. The positive potential of the part 23 relative to the discharge within it depends, of course, on the value of the resistance 26, and can be increased by reducing this resistance, and vice versa. This effect, therefore, supplements that of the diversion of discharge current from the main anode 16 to the part 23 as just described.

Whatever the value of the resistance 26, the effect of the part 23 and the connection 25 on the current-light curve of the device is subtractive in the sense that the light for a given discharge current flowing in the circuit 17 is reduced. Naturally, this effect is proportionally greater for low currents, since the smaller the current flow, the greater the proportion of it that can be accommodated by the path via the part 23 and the resistance 26, which gives rise to a lower intensity of radiation than an equal current via the main anode 16. Accordingly, the lower end of the current-light curve is depressed very greatly in proportion to its height above zero, while the upper end of this curve is scarcely affected. Thus the connection 25 with its resistance 26 makes the end-on intensity of radiation toward the receiving system R vary in a greater ratio than the discharge current, and this ratio can be altered by adjusting the resistance 26. For example, in a device such as shown in Fig. 2 constructed as described hereinafter, a reduction of the discharge current to one fourteenth its initial value reduced the end-on luminous intensity to one-twelfth its initial value with the connection 25 open-circuited, but reduced this luminous intensity to one-thirtieth its initial value with a resistance 26 of an effective value of 75,000 ohms in the closed connection 25.

Fig. 3 shows a discharge device L similar to that in Figs. 1 and 2 but having the anode means forming the positive column channel or crater longer relative to the distance between the main electrodes 15, 16 than in Figs. 1 and 2, and divided transversely into a series of conductive annular sections 23a, 23b, 23c, 23d, electrically separate or insulated from one another. These sections 23a, 23b, 23c, 23d are connected to the main anode 16 through connections 25a, 25b, 25c, 25d of different resistances, shown as leading to different points that can be adjusted along the potentiometer voltage divider 26x. This arrangement gives a very flexible and wide adjustment of the ratio between variation of end-on radiation intensity and corresponding discharge current.

For the convenience of those desiring to practice the invention, essential illustrative particulars of a discharge device such as shown in Fig. 2 are here given:

The bulb or envelope 20 may be of about 1 inch internal diameter and 2½ inches long, with a substantially flat front end, and the stem 27 and its press 28 may extend forward into the interior of the bulb about 1⅝ inches. The rear side of the disc 33 may be about ½ inch in front of the press 28; the disc may be about 3/32 inch thick; and the sleeve 23 may have this same axial length and an internal diameter of about 0.2 inch. The cathode bar 15 may be about ⅜ inch long and 3/32 inch in diameter, with its axis 3/32 inch behind the rear side of the disc 33. The anode 16 may be of about ⅜ inch diameter, with a central hole of 0.2 inch diameter, and its dome height from the front side of the disc 33 may be about 1/16 inch. The coil 30 may be spaced about ¼ inch behind the cathode 15, on centers, and may consist of a (straight) length of 8 mil tungsten wire between the leads 12, 29 with a cold resistance of 0.4 ohm, the diameter of the major coiling being about 3/32 inch. There may be some dozen or more of the disc holes 36, each of about 3/32 inch diameter or more.

What I claim as new and desire to secure by Letters Patent of the United States is:

1. A gaseous electric discharge lamp comprising a sealed envelope containing an ionizable medium, a cathode and an anode connected to a source of potential and arranged to sustain therebetween a positive column discharge visible end-on past the anode, means for modulating the potential difference and the discharge current, a control electrode of hollow form surrounding the discharge path between said cathode and anode, and means to connect said control electrode in parallel with said anode and to bias it to a potential substantially different from that of the anode so that the intensity of radiation from the discharge varies in an appreciably greater proportion than the current input to the lamp.

2. The invention as set forth in claim 1 wherein the control electrode is divided transversely into a plurality of sections which are positively biased in decreasing degree from the anode toward the cathode.

3. A gaseous electric discharge lamp of the positive column type comprising a sealed envelope containing an ionizable medium, an annular insulating disc extending transversely across the interior of said envelope, a cathode located behind the opening in said disc, an annular anode located in front of said disc in axial alignment with the opening in said disc, and a cylindrical control electrode lining the opening in said disc and surrounding the discharge path between said cathode and anode.

4. A gaseous electric discharge lamp comprising a sealed envelope containing an ionizable medium, an annular insulating disc extending transversely across the interior of said envelope, a cathode located behind the opening in said disc, an annular anode located in front of said disc in axial alignment with the opening in said disc, and a cylindrical control electrode lining the opening in said disc, a pair of conductors sealed in the back end of said envelope and extending forwardly through said disc to support it in place, said anode and control electrode being electrically connected one to each of said conductors, and a third conductor sealed in the back end of said envelope and extending to said cathode to support it in place.

5. A gaseous electric discharge lamp comprising a sealed envelope containing an ionizable medium, a cathode and an anode connected to a source of potential and arranged to sustain therebetween an ionic discharge visible end-on past the anode, means for modulating the potential difference and the discharge current, and electrode means spaced axially intermediate said cathode and anode and closely adjacent the discharge path therebetween to render the intensity of radiation from the discharge appreciably disproportional to the current input to the lamp by diverting current from the anode.

6. A gaseous electric discharge lamp comprising a sealed envelope containing an ionizable medium, a cathode and an anode connected to a source of potential and arranged to sustain therebetween an ionic discharge visible end-on past the anode, means for modulating the potential difference and the discharge current, and means to render the intensity of radiation from the discharge appreciably disproportional to the current input to the lamp by diverting current from the anode including a control electrode spaced axially intermediate said cathode and anode and closely adjacent the discharge path therebetween and having a substantial area in operative relation with said discharge and means to connect said control electrode in parallel with said anode and to bias it to a potential substantially different from that of the anode.

7. A gaseous electric discharge lamp comprising a sealed envelope containing an ionizable medium, a cathode and an anode connected to a source of potential and arranged to sustain therebetween a positive column discharge visible end-on past the anode, means for modulating the potential difference and the discharge current, a control electrode located axially intermediate said cathode and anode and closely adjacent the discharge path between said cathode and anode and having a substantial area in operative relation with said positive column discharge sufficient to modify said discharge so that the intensity of the radiation from the discharge is appreciably disproportional to the current input to the lamp.

8. A gaseous electric discharge lamp comprising a sealed envelope containing an ionizable medium, a cathode and an anode connected to a source of potential and arranged to sustain therebetween a positive column discharge visible end-on past the anode, means for modulating the potential difference and the discharge current, a control electrode spaced axially intermediate said cathode and anode and closely adjacent the discharge path between said cathode and anode and having a substantial area in operative relationship with said positive column discharge so that an appreciable portion of said discharge may be diverted from said anode in accordance with the potential of said control electrode, and means for impressing on said control electrode a potential which is positive relative to that portion of said discharge in proximity to said electrode so that, due to diversion of current from the main discharge, the intensity of radiation from the discharge varies in an appreciably greater proportion than the current input to the lamp.

9. A gaseous electric discharge lamp comprising a sealed envelope containing an ionizable medium, a cathode and an anode connected to a source of potential and arranged to sustain therebetween a positive column discharge visible end-on past the anode, means for modulating the potential difference and the discharge current, a control electrode located axially intermediate said cathode and anode and closely adjacent the discharge path between said cathode and anode, and means to connect said control electrode in parallel with said anode through a resistance to bias it to a potential substantially more positive than that portion of the discharge in proximity to said electrode so that, due to diversion of current from the main discharge, the intensity of radiation from the discharge varies in an appreciably greater proportion than the current input to the lamp.

10. A gaseous electric discharge lamp comprising a sealed envelope containing an ionizable medium, a cathode and an anode connected to a source of potential and arranged to sustain therebetween a positive column discharge visible end-on past the anode, means for modulating the potential difference and the discharge current, a control electrode located axially intermediate said cathode and anode and closely adjacent the discharge path between said cathode and anode, and means to connect said control electrode in parallel with said anode through a variable resistance to bias it to a potential substantially more positive than that portion of said discharge in proximity to said electrode so that, due to diversion of current from the main discharge, the intensity of radiation from the discharge varies in an appreciably greater proportion than the current input to the lamp.

EUGENE LEMMERS.

REFERENCES CITED

The following references are of record in the file of this patent:

UNITED STATES PATENTS

| Number | Name | Date |
|---|---|---|
| 1,915,934 | Holst et al. | June 27, 1933 |
| 1,970,223 | Case | Aug. 14, 1934 |
| 2,135,941 | Hirmann | Nov. 8, 1938 |
| 2,163,546 | Clothier | June 20, 1939 |
| 2,165,028 | Blumlein | July 4, 1939 |
| 2,185,807 | Gabor et al. | Jan. 2, 1940 |
| 2,189,321 | Morton | Feb. 6, 1940 |
| 2,227,829 | Hansell | Jan. 7, 1941 |